United States Patent
Zhu et al.

(10) Patent No.: US 8,300,613 B2
(45) Date of Patent: Oct. 30, 2012

(54) TECHNIQUES FOR DETECTING BEACONS ON WIRELESS CHANNELS

(75) Inventors: Jing Zhu, Portland, OR (US); Ofer Markovits, Haifa (IL)

(73) Assignee: Intel Corporation, Santa Clara, CA (US)

( * ) Notice: Subject to any disclaimer, the term of this patent is extended or adjusted under 35 U.S.C. 154(b) by 595 days.

(21) Appl. No.: 12/455,745

(22) Filed: Jun. 5, 2009

(65) Prior Publication Data

US 2010/0309893 A1 Dec. 9, 2010

(51) Int. Cl.
*H04W 4/00* (2009.01)
*H04J 3/00* (2006.01)
*H04Q 7/20* (2006.01)

(52) U.S. Cl. ........ 370/338; 370/329; 370/345; 455/425; 455/426.1; 455/443

(58) Field of Classification Search .......... 370/276–348; 455/73–553.1
See application file for complete search history.

(56) References Cited

U.S. PATENT DOCUMENTS

| | | | |
|---|---|---|---|
| 2005/0128988 A1* | 6/2005 | Simpson et al. | 370/338 |
| 2006/0019660 A1* | 1/2006 | Li | 455/434 |
| 2006/0221914 A1* | 10/2006 | Waxman | 370/338 |
| 2008/0002632 A1 | 1/2008 | Pandey et al. | |
| 2010/0290414 A1* | 11/2010 | Yamada | 370/329 |

FOREIGN PATENT DOCUMENTS

| | | |
|---|---|---|
| WO | 2008/008987 A2 | 1/2008 |
| WO | 2008/010168 A2 | 1/2008 |
| WO | 2008/027907 A2 | 3/2008 |
| WO | 2010141152 A2 | 12/2010 |

OTHER PUBLICATIONS

International Search Report and Written Opinion received for PCT Patent Application No. PCT/US2010/030809, mailed on Nov. 26, 2010, 8 pages.
International Preliminary Report on Patentability for PCT Patent Application No. PCT/US2010/030809, mailed on Dec. 15, 2011, 4 pages.

* cited by examiner

*Primary Examiner* — Afsar M. Qureshi
(74) *Attorney, Agent, or Firm* — Glen B. Choi

(57) ABSTRACT

A wireless local access network (WLAN) radio listens for a beacon for a listening duration on each of multiple channels. Periodically, the WLAN radio changes the channel on which the WLAN radio listens for a beacon. The WLAN radio rotates through all channels until an entire beacon period is listened to. The number of iterations is chosen to minimize the overlap of successive listening durations. The WLAN radio can detect a beacon by detecting an incomplete portion of a beacon.

17 Claims, 4 Drawing Sheets

TECHNIQUES FOR DETECTING BEACONS ON WIRELESS CHANNELS

FIELD

The subject matter disclosed herein relates generally to techniques for detecting wireless communications channels.

RELATED ART

With the increasing availability of wireless technology and connectivity, devices carrying multiple radios are not uncommon. As one example, combinations of Bluetooth, WiFi, and WiMAX technologies may be made available on computation and communication platforms such as laptops and handheld devices. These types of platforms may be equipped with multiple co-located radios. Such platforms may be referred to as a Multi-Radio Platforms (MRPs). MRPs may include the co-location of Bluetooth, WiMAX, and even WiFi radios to accommodate various uses and conveniences.

FIG. 1 depicts a scenario involving a multi-radio mobile terminal that performs a network scan to establish a wireless local area network (WLAN) connection with a WLAN access point (AP) while attempting to maintain continuous service over an active wireless wide area network (WWAN) connection with a WWAN base station (BS).

Time Division Multiplex (TDM) is a common solution for the coexistence of multiple radios on the same device. TDM prevents inter-radio interference or resource conflict by interleaving co-located radio activities over time. Typically, WWAN operations are blocked during a network scan to establish a WLAN connection and vice versa.

In the scenario of FIG. 1, a WLAN radio tries to discover the neighboring WLAN access points by scanning a list of channels while trying to co-exist with a WWAN radio with an active WWAN connection. An absence duration and an absence period respectively indicate how long a WWAN radio is silent and how often the absence durations repeat. The absence duration and absence period are negotiated with a WWAN base station. Usually, the absence duration is set long enough for a WLAN radio to complete at least one active scan. In many cases, a WLAN radio uses a passive scan whereby a WLAN radio does not transmit signals but instead waits to receive a beacon broadcast by an access point. IEEE 802.11-2007 describes a manner in which an access point transmits beacon frames at regular intervals to announce the presence of a WLAN network.

In some cases, the WLAN radio must stay on one channel for multiple absence periods to receive signals from an access point over a full beacon interval. However, a WWAN radio is not able to be absent for too long a time without causing significant performance degradation in the WWAN connection. It is desirable for a WLAN radio to detect a beacon while avoiding excessive WWAN radio silence.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Figure 1:
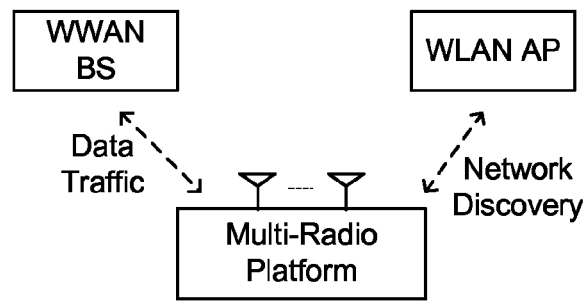
FIG. 1 depicts a multi-radio mobile terminal that performs a network scan to establish a wireless local area network connection with a WLAN access point while attempting to maintain continuous service over an active wireless wide area network connection with a WWAN base station.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, 802.16m, or 3GPP standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks. IEEE 802.11x may refer to any existing IEEE 802.11 specification, including but not limited to 802.11a, 802.11b, 802.11e, 802.11g, 802.11 h, 802.11i, and 802.11n.

Various embodiments reduce the time the WLAN radio performs a passive scan for beacons on channels while coexisting with a WWAN radio. In various embodiments, the WLAN radio listens for a beacon for a period of time. Periodically, the WLAN radio changes the channel on which the WLAN radio listens for a beacon. In some embodiments, the WLAN radio identifies a beacon by detecting an incomplete portion of a beacon. Various embodiments reduce a total scan time for beacons by minimizing time overlap between successive beacon detecting times on the same channel.

Figure 2:
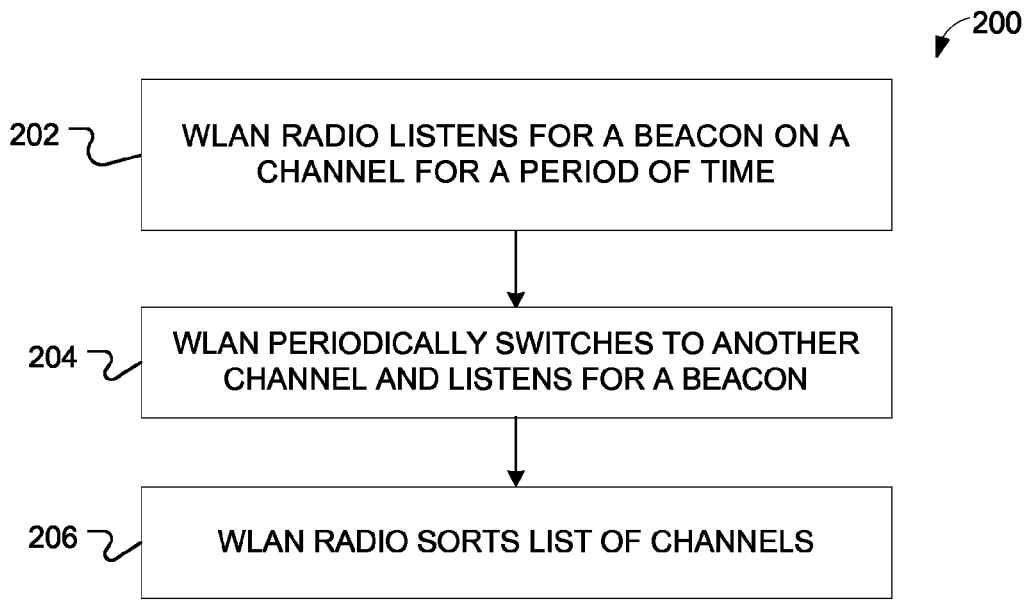
FIG. 2 depicts a process to detect at least one beacon, in accordance with an embodiment.

FIG. 2 depicts a process to detect at least one beacon, in accordance with an embodiment. Blocks 202 and 204 include a WLAN radio awaiting receipt of a beacon on a channel for a period of time and periodically switching to a different channel to listen for a beacon. Blocks 202 and 204 may take place in a manner described with regard to FIGS. 3 and 4. In some embodiments, the WLAN radio attempts to detect a beacon on each channel using a passive scan. In various embodiments, the WLAN radio may identify a beacon on a channel by detecting less than an entire beacon. For example, the WLAN radio may identify a beacon by detecting a portion of a media access control (MAC) header of the beacon. The WLAN radio may determine received signal stress indicator (RSSI) values for each channel on which a beacon is detected. The WLAN radio may identify a list of selected channels for which at least a portion of a beacon has been detected.

Block 206 includes the WLAN radio sorting the selected channel list based on RSSI levels. The WLAN radio may sort the channels by increasing RSSI levels. Block 206 may also include the WLAN radio using an active scan for each channel on the sorted list. An active scan can be used now because the active access point is already detected through partial beacon detection. In some embodiments, block 206 may be avoided if the WLAN radio finds the preferred access points in blocks 202 and 204.

Figure 3:
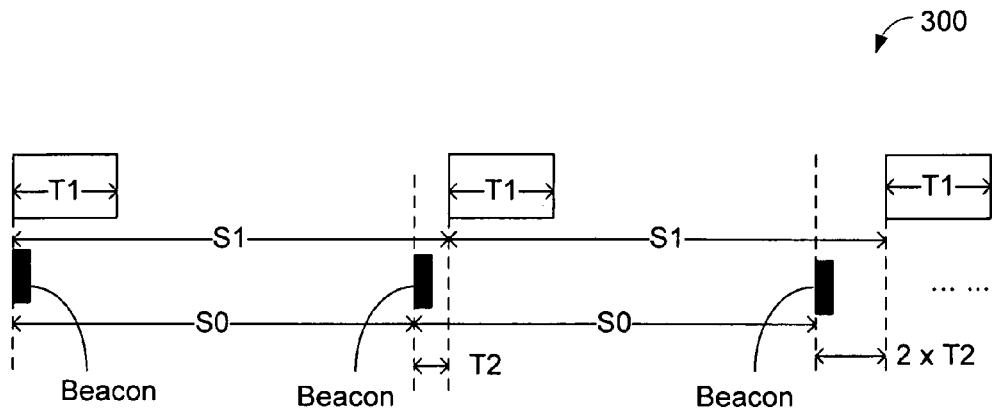
FIG. 3 illustrates a period of a beacon transmission, S0, and a period of a WLAN radio's passive scan for a beacon on a channel, S1.

FIG. 3 illustrates a period of a beacon transmission, S0, and a period of a WLAN radio's passive scan for a beacon on a channel, S1. For example, a WLAN radio may passively scan for a beacon in a manner described in IEEE 802.11-2007. A time gap exists between S0 and S1. The time gap is represented as T2, where T2 is |S0-S1|. Every period of S1, the lack of overlap increases by T2.

In various embodiments, at the beginning of each period S1, a WLAN radio passively scans a different channel for a duration of T1. During the duration T1, the WWAN radio does not transmit signals to any WWAN base station. Period S1 is sometimes called an "absence period." For example, at the beginning of the first absence period, the WLAN radio listens to channel 1 and then at the beginning of the second absence period, the WLAN radio listens to channel 2. At the beginning of the M-th period, the radio switches to channel M. At the beginning of the M+1th period, the radio will listen to channel 1 again. Such procedure will continue until the radio completes a passive scan for all M channels.

Figure 4:
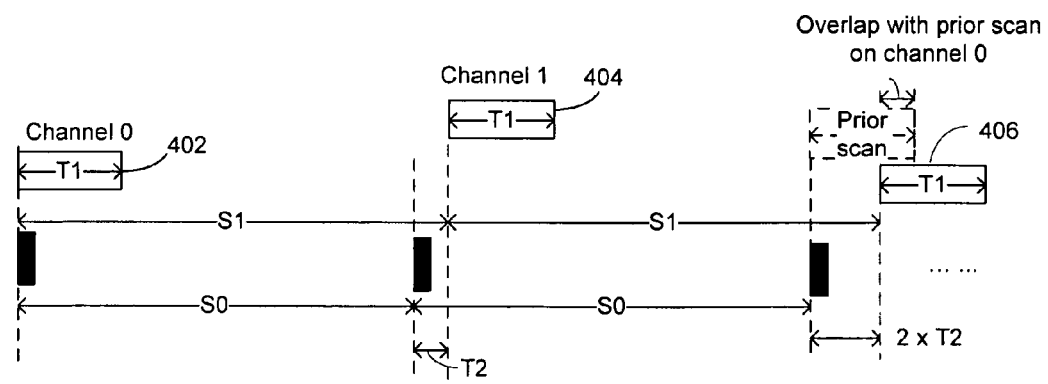
FIG. 4 depicts an example of three scans, in accordance with an embodiment.

FIG. 4 depicts an example of three scans, in accordance with an embodiment. In scan 402, a WLAN radio performs a first passive scan of channel 0 for a beacon during time region T1. During scan 404, at the start of a second period S1, the WLAN radio performs a passive scan of another channel, channel 1, during time region T1. In a second scan of channel 0, shown as scan 406, the WLAN radio scans for a beacon for time region T1 that overlaps with the time region scanned in a previous scan, scan 402.

In various embodiments, the value of M (i.e., a number of channels for which a scan is repeated at least once) is chosen to lessen or, in some cases, minimize the overlap of scan that takes place between two successive scans on the same channel. In various embodiments, M is calculated as:

$$M = \text{floor}(T1/T2), \text{ where}$$

T1 represents a time period in which a WLAN passively scans for a beacon and

T2 represents a time shift per absence period, given by |S0-S1|.

The floor operation rounds a ratio down to a lower integer.

An entire beacon interval, S0, of any channel may not be listened-to during time region T1. For the region T1 to shift enough for the WLAN radio to listen to an entire beacon interval S0 for every channel, the WLAN radio cycles through M channels for N number of rounds. The minimum number of rounds N to cover a full beacon interval S0 is based on the following criteria:

$$M \times T2 \times (N-1) + T1 > S0.$$

Thus, in various embodiments, $$N = \text{ceiling}((S0-T1)/(M \times T2) + 1).$$

The ceiling function rounds up a value to the nearest integer.

In addition, the total number of channels a radio is to scan may be more than M channels. For example, there may be K number of available channels. In such case, the K channels are divided into groups of M channels. After scanning M channels for N rounds, the WLAN radio scans the next group of M channels for N rounds, and so forth. The total scan time S2 to scan all K channels can be determined as:

$$S2 = N \times M \times S1 \times \text{ceiling}(K/M).$$

When M=1, a traditional continuous scan takes place and the total scan time is calculated by $$S2 = K \times (\text{ceiling}((S0-T1)/T2) + 1) \times S1.$$

Figure 5:
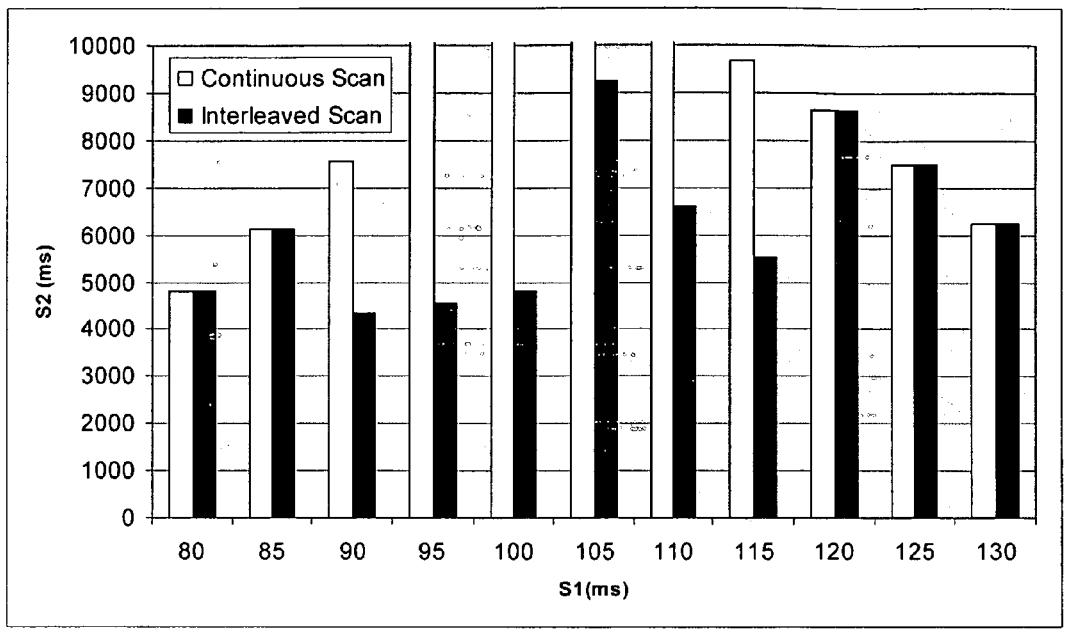
FIG. 5 depicts a comparison of the total scan time S2 of the proposed interleaved scan with the traditional continuous scan.

For a scenario in which S0=102.4 ms, T1=30 ms, and K=12, FIG. 5 depicts a comparison of the total scan time S2 of the interleaved scan techniques with the traditional continuous scan. A significant reduction in total scan time S2, is shown particularly when the absence period (S1) is set to 90, 95, 100, 105, 110, and 115 ms.

Scanning a beacon during a time region T1 may not detect an entire beacon. A beacon can be very long such as, for example, 2 ms or 5 ms. Various embodiments detect a partial beacon without receiving an entire beacon.

Figure 6:
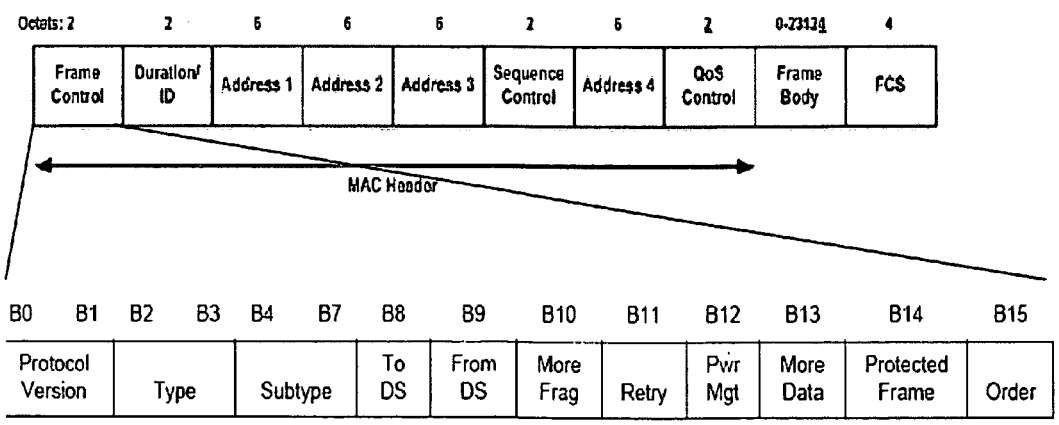
FIG. 6 depicts an IEEE 802.11 compliant MAC header.

FIG. 6 depicts an IEEE 802.11 compliant MAC header. The frame control portion of the MAC header is enlarged. In various embodiments, a WLAN radio detects a partial beacon if the cyclic redundancy check (CRC) of the physical layer (PHY) header is correct or the frame control portion of the media access control (MAC) header indicates that the frame is beacon. A CRC can be performed on an incomplete portion of a beacon. In blocks 202 and 204 of FIG. 2, a WLAN radio may detect a partial beacon in such a manner. Table 1 shows an example of a frame control portion associated with a beacon frame based on the IEEE 802.11 standard.

TABLE 1

| Beacon Frame Control Template | | | | | | | | | | | | | | | |
|---|---|---|---|---|---|---|---|---|---|---|---|---|---|---|---|
| B0 | B1 | B2 | B3 | B4 | B5 | B6 | B7 | B8 | B9 | B10 | B11 | B12 | B13 | B14 | B15 |
| 0 | 0 | 0 | 0 | 0 | 0 | 0 | 1 | 0 | 0 | 0 | 0 | 0 | 0 | 0 | 0 |

In various embodiments, a WLAN radio determines a received signal stress indicator (RSSI) for a WLAN frame if both the CRC of the PHY header is correct and the frame control portion of the MAC header indicates that the frame is beacon. A channel that does not have any RSSI will not be included in the list of selected channels.

In various embodiments, for channels in which an entire or partial beacon is detected, the channels are prioritized based on RSSI values. In block 206 of FIG. 2, the WLAN radio may order the RSSI values based on increasing RSSI values.

Figure 7:
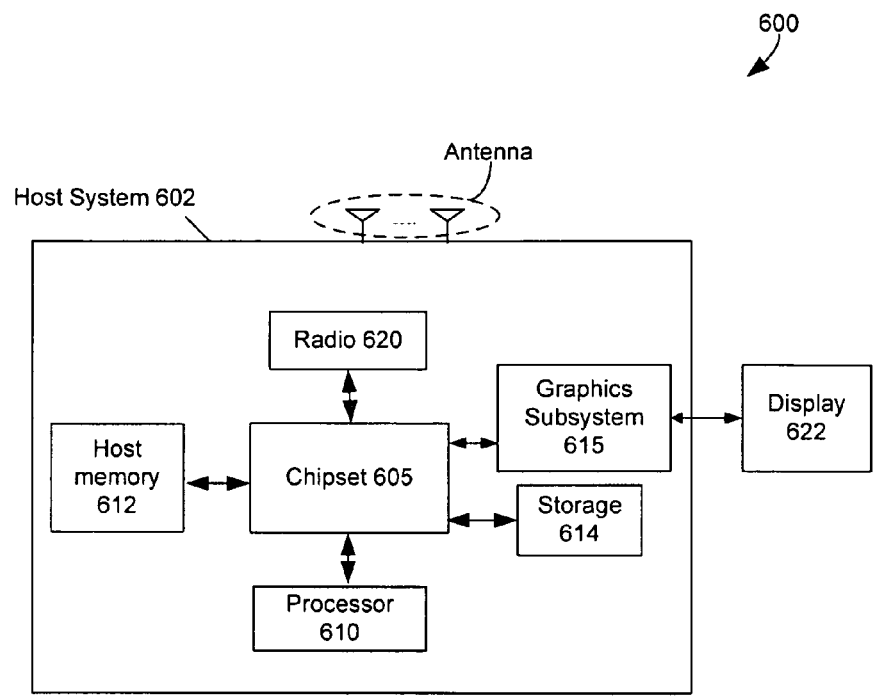
FIG. 7 depicts an example system that can use embodiments of the present invention.

FIG. 7 depicts an example system that can use embodiments of the present invention. Computer system 600 may include host system 602 and display 622. Computer system 600 can be implemented in a handheld personal computer, mobile telephone, set top box, or any computing device. Host system 602 may include chipset 605, processor 610, host memory 612, storage 614, graphics subsystem 615, and radio 620. Chipset 605 may provide intercommunication among processor 610, host memory 612, storage 614, graphics subsystem 615, and radio 620. For example, chipset 605 may include a storage adapter (not depicted) capable of providing intercommunication with storage 614. For example, the storage adapter may be capable of communicating with storage 614 in conformance with any of the following protocols: Small Computer Systems Interface (SCSI), Fibre Channel (FC), and/or Serial Advanced Technology Attachment (S-ATA).

Processor 610 may be implemented as Complex Instruction Set Computer (CISC) or Reduced Instruction Set Computer (RISC) processors, multi-core, or any other microprocessor or central processing unit.

Host memory 612 may be implemented as a volatile memory device such as but not limited to a Random Access Memory (RAM), Dynamic Random Access Memory (DRAM), or Static RAM (SRAM). Storage 614 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 615 may perform processing of images such as still or video for display. An analog or digital interface may be used to communicatively couple graphics subsystem 615 and display 622. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605.

Radio 620 may include one or more radios capable of transmitting and receiving signals in accordance with applicable wireless standards such as but not limited to any version of IEEE 802.3, IEEE 802.11, and IEEE 802.16. In various embodiments, radio 620 performs techniques described with regard to FIGS. 2-4 to detect active WLAN channels.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   permitting a radio to passively scan for a beacon on a first channel;
   permitting the radio to passively scan for a beacon on a second channel;
   identifying a beacon in any channel based in part on an incomplete portion of the beacon, and
   permitting the radio to repeatedly passively scan the first channel for a first time duration until successive first time durations encompass an entire beacon interval.

2. The method of claim 1, further comprising:
   changing the channel on which the radio passively scans for a beacon until the radio passively scans all channels in a group of channels.

3. The method of claim 2, wherein the radio passively scans a channel for a first time region and further comprising:
   establishing a number of channels in the group to reduce time overlap of the first time region for successive passive scans by the radio of the same channel.

4. The method of claim 3, wherein the number of channels comprises:

$M = \text{floor}(T1/T2)$, where

T1 represents a time duration in which the radio passively scans for a beacon on a channel and T2 represents a time shift that occurs per absence period between a period of beacon transmissions and a period at which the radio passively scans for a beacon on a channel.

5. The method of claim 1, wherein the incomplete portion comprises:
a frame control portion of a received MAC header.

6. The method of claim 1, wherein the identifying a beacon in any channel comprises:
verifying a cyclic redundancy check value of a received PHY header.

7. The method of claim 1, further comprising:
determining a received signal stress indicator (RSSI) for each channel and
prioritizing each channel based in part on an RSSI value associated with the channel.

8. A mobile station comprising:
an antenna to receive and transmit signals;
a wireless wide area network radio; and
a wireless local area network radio comprising:
logic to passively scan a first channel received through the antenna for a first time duration X number of times, wherein the first time duration is less than an entire beacon interval and wherein X is set to reduce overlap between successive passive scans for the first time duration of the same channel, and
wherein the logic to passively scan a first channel is to repeatedly passively scan the first channel for the first time duration until sequential first time durations encompass an entire beacon interval.

9. The mobile station of claim 8, further comprising:
logic to passively scan a second channel received through the antenna for the first time duration X number of times.

10. The mobile station of claim 9, further comprising:
logic to identify a beacon on the first or second channels based in part on an incomplete portion of the beacon.

11. The mobile station of claim 8, further comprising:
logic to identify a beacon on the first channel based in part on an incomplete portion of the beacon, wherein to identify a beacon, the logic to identify a beacon is to detect a frame control portion of a received MAC header.

12. The mobile station of claim 8, further comprising:
logic to identify a beacon on the first channel based in part on an incomplete portion of the beacon, wherein to identify a beacon, the logic to identify a beacon is to verify a cyclic redundancy check value of a received PHY header.

13. The mobile station of claim 8, wherein the wireless wide area network radio complies with IEEE 802.16.

14. A system comprising:
an antenna;
a computer system comprising:
logic to passively scan a first channel received through the antenna for a first time duration X number of times, wherein the first time duration is less than an entire beacon interval and wherein X is set to reduce overlap between successive passive scans for the first time duration of the same channel;
a display device communicatively coupled to the computer system to display information received from the computer system, and
wherein the logic to passively scan a first channel is to repeatedly passively scan the first channel for the first time duration until sequential first time durations encompass an entire beacon interval.

15. The system of claim 14, wherein the computer system further comprises:
logic to passively scan a second channel received through the antenna for the first time duration X number of times.

16. The system of claim 14, wherein the computer system further comprises:
logic to identify a beacon on the first channel based in part on an incomplete portion of the beacon, wherein the logic to identify a beacon is to detect a frame control portion of a received MAC header.

17. The system of claim 14, wherein the computer system further comprises:
logic to identify a beacon on the first channel based in part on an incomplete portion of the beacon, wherein the logic to identify a beacon is to verify a cyclic redundancy check value of a received PHY header.

\* \* \* \* \*